(12) United States Patent
Keyser et al.

(10) Patent No.: US 10,239,427 B2
(45) Date of Patent: Mar. 26, 2019

(54) VEHICLE SEAT WITH FOLDABLE STOW POSITION

(71) Applicant: Lear Corporation, Southfield, MI (US)

(72) Inventors: Mark R. Keyser, Lake Orion, MI (US); Andrzej Dlugokecki, Mountain View, CA (US); Robert Szybisty, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 113 days.

(21) Appl. No.: 15/192,362

(22) Filed: Jun. 24, 2016

(65) Prior Publication Data
US 2017/0001546 A1 Jan. 5, 2017

Related U.S. Application Data

(60) Provisional application No. 62/237,620, filed on Oct. 6, 2015, provisional application No. 62/188,101, filed on Jul. 2, 2015.

(51) Int. Cl.
*B60N 2/30* (2006.01)
*B60N 2/12* (2006.01)
*B60N 2/22* (2006.01)

(52) U.S. Cl.
CPC ............. *B60N 2/3065* (2013.01); *B60N 2/12* (2013.01); *B60N 2/2209* (2013.01);
(Continued)

(58) Field of Classification Search
CPC .. B60N 2/3065; B60N 2/3093; B60N 2/2209; B60N 2/3011; B60N 2/045; B60N 2/10;
(Continued)

(56) References Cited

U.S. PATENT DOCUMENTS 6,974,174 B2 12/2005 Imago et al.
7,328,939 B2 * 2/2008 Moriyama ........... B60N 2/0232
297/15
(Continued)

FOREIGN PATENT DOCUMENTS

CN 1530255 A 9/2004
CN 101578197 A 11/2009
(Continued)

OTHER PUBLICATIONS

Chinese Patent Office, First Office Action for Chinese Application No. 201610520435.8, dated Mar. 12, 2018.

*Primary Examiner* — Milton Nelson, Jr.
(74) *Attorney, Agent, or Firm* — Brooks Kushman P.C.

(57) ABSTRACT

A foldable vehicle includes a seat base, a seatback connected to the seat base for pivotal movement relative to the seat base from a generally vertical use position to a generally horizontal stow position atop the seat base, wherein the seat base is pivotally connected to the floor such that, when the seatback is moved from its use position to the folded, stow position, the seat base may be moved rearward and downward to thereby provide a lower load floor position. The seat also includes a lock mechanism to engage and lock the seat base in a first position when the seatback is positioned within the defined range of use positions, and unlock the seat base for movement to a second position when the seatback is positioned outside the use range.

18 Claims, 10 Drawing Sheets

(52) U.S. Cl.
CPC ........... *B60N 2/2227* (2013.01); *B60N 2/309* (2013.01); *B60N 2/3009* (2013.01); *B60N 2/3011* (2013.01); *B60N 2/3093* (2013.01)

(58) Field of Classification Search
CPC ........ B60N 2/12; B60N 2/309; B60N 2/3009; B60N 2/2227
USPC .................. 297/340, 378.12, 325; 296/65.09
See application file for complete search history.

(56) References Cited

U.S. PATENT DOCUMENTS

| | | |
|---|---|---|
| 8,313,144 B2 | 11/2012 | Holdampf |
| 2006/0061183 A1* | 3/2006 | White ................. B60N 2/01583 297/378.12 |
| 2007/0296258 A1 | 12/2007 | Calvert et al. |
| 2010/0052389 A1 | 3/2010 | Holdampf |

FOREIGN PATENT DOCUMENTS

| | | | | |
|---|---|---|---|---|
| CN | 103380023 A | 10/2013 | | |
| DE | 102005003603 A1 * | 7/2006 | ........... | B60N 2/3031 |
| DE | 102007017260 A1 | 12/2007 | | |
| FR | 2896459 A1 * | 7/2007 | ........... | B60N 2/3011 |
| JP | 2005059765 A | 3/2005 | | |

* cited by examiner

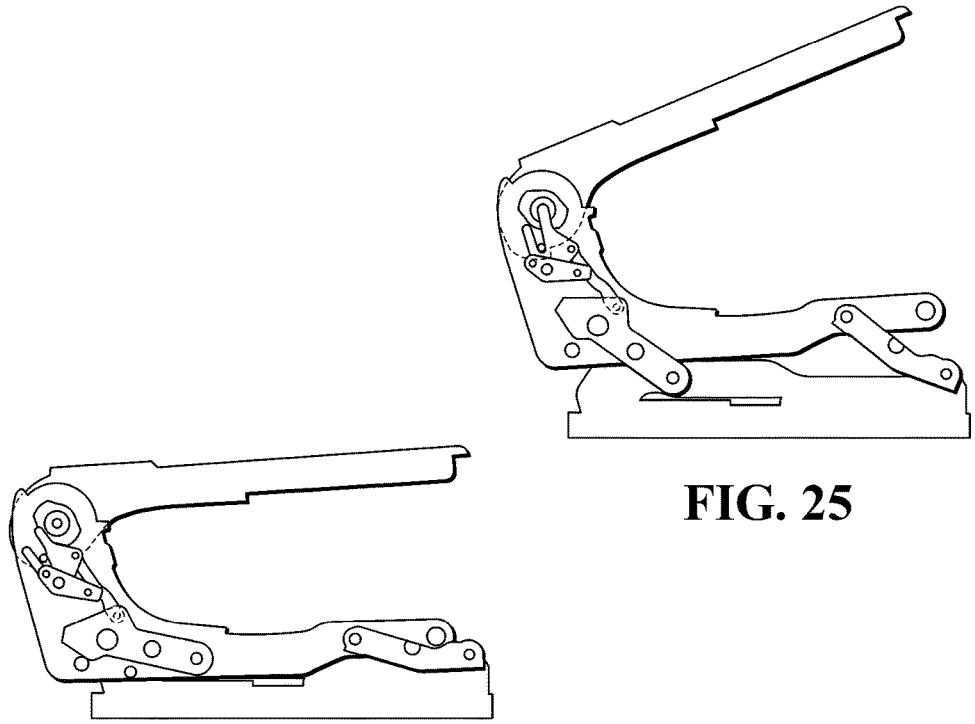
FIG. 25
FIG. 26
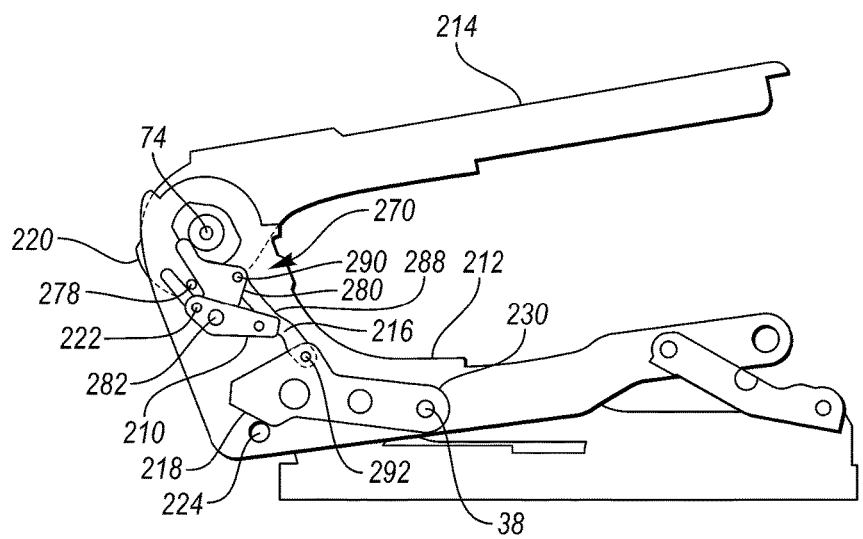
FIG. 27

VEHICLE SEAT WITH FOLDABLE STOW POSITION

CROSS-REFERENCE TO RELATED APPLICATIONS

This application claims the benefit of U.S. provisional application Ser. Nos. 62/237,620 filed Oct. 6, 2015, and 62/188,101 filed Jul. 2, 2015, the disclosures of which are hereby incorporated in their entirety by reference herein.

TECHNICAL FIELD

The present invention relates to a vehicle seat that is adjustable from a use position to a folded ("stow") position, and one or more other folded positions to facilitate occupant entry.

BACKGROUND

Sport-utility vehicles, minivans, and other crossover vehicle designs often include second or third row seats which may be adjustable from a seating position for accommodating passengers to a stow position to provide cargo space.

It is often desirable to provide a relatively low load floor height to minimize the lift height of objects loaded into vehicles. It is also often desirable to maximize potential vehicle cargo volumes. A further vehicle design objective also often includes minimizing or eliminating angled and or multi-leveled load floors that might result from folding auxiliary seats to their stow positions.

It may also be desirable to minimize the gap between the rear edge of the load surface of the seat when it is folded into the load position and the adjacent edge of the load surface located immediately rearward of the folded seat.

It may also be desirable, for seats employed in second row applications, to provide the seats with the capability of performing additional folding, sliding, tipping, or other articulating functions to temporarily provide additional ingress/egress space for occupants accessing a rearward row of seats.

Existing auxiliary row seats often include articulating mechanisms which re-position the seat cushion and associated support frame (together, "the seat base"), such as, for example, by moving the seat base forward and/or tipping the forward end of the seat base downward, to allow the seatback to achieve a more flattened and/or lower position when the seatback is folded forward over the seat base.

SUMMARY

According to one aspect of the present disclosure, a vehicle seat is disclosed that has a seat base that may be shifted between a raised, use position and a lowered position, and a seatback attached to the seat base and foldable from a generally vertical use position to a folded-forward position in which the seatback is generally parallel and atop the seat base. The seat base is pivotally connected to the floor of the vehicle by virtue of a riser assembly that includes at least two pivoting links, each of which are connected for pivotal rotation with respect to both the vehicle floor and the seat base frame such that, when the seat is moved from its use position to the folded, stow position, the seat base moves rearward and downward to thereby provide (1) a lower load floor position, and (2) a reduced gap between the load surface of the folded seat and the load surface to the rear of the folded seat.

According to another aspect of the disclosure the seat includes a lock mechanism which is engageable to lock at least one of the pivoting links in a fixed position to thereby lock the seat base in, for example, its use position, and disengageable to unlock the pivoting link to allow the seat base to move, for example, from its use position to a stow position.

According to another aspect of the disclosure, in one embodiment, the folding mechanism employs a modified Geneva drive linkage which includes slotted linkage member, such as a rotating plate, which engages a drive member to redirect a portion of the force of the forward rotation of the seatback to drive at least one of the rear pivoting links and rotate the links to thereby lower the seat base and move it rearward as the seatback is rotated forward from its use to the stow position atop the seat cushion. In this disclosed embodiment, the seat base lock mechanism may include a lock cam which engages a cam surface on the plate to prevent the modified Geneva plate from rotating for a selected portion of the rotational movement of the seatback and thereby lock the seat base in position for a selected range of the seatback's motion.

According to another aspect of the disclosure, in another embodiment, the folding mechanism employs a modified drive linkage which utilizes a drive member in the form of a rotating drive pin and a slotted linkage member in the form of a slotted bell-crank plate to redirect a portion of the force of the forward rotation of the seatback to drive at least one of the rear pivoting links and rotate the links to thereby lower the seat base and move it rearward as the seatback is rotated forward from its use to the stow position atop the seat cushion. In this disclosed embodiment, the seat base lock mechanism may include a pivoting lock cam and at least one locking surface on the support leg which interfaces with the lock cam as the lock cam alternatively moves to (1) engage the locking surface on the support leg and lock the leg from rotation (and thereby lock the seat base in its use position), and (2) disengage from the lock surface to allow the support leg to rotate and thereby unlock the seat base to allow it to move rearward and downward as the seatback is rotated forward from its use to the stow position atop the seat cushion.

According to another aspect of the disclosure, the vehicle seat may also be slidably mounted on one or more tracks such that the seat may be positioned fore and aft, both for the comfort of a seated occupant, as well as to position the seat in the fore and aft directions as it folds and unfolds from its use position to the stow position, and/or various other non-use positions.

According to another aspect of the disclosure, the seat may be employed as a second (or intermediate) row seat wherein the rear portion of the seat base may be releasably mounted to fore-aft seat tracks, such that the rear portion of the seat base may be pivoted upward and forward, and the entire seat slidably positioned forward with the seatback remaining in its use position, thereby tipping and sliding the seat forward nearest the front row seats to create more space for ingress/egress to a third row of seats.

According to another aspect of the disclosure, the seat may be employed as a second (or intermediate) row seat wherein the rear portion of the seat base may be releasably mounted to fore-aft seat tracks, and wherein the seatback may be rotated forward atop the seat base, the rear portion of the seat base and seatback thereafter pivoted upward and forward, and the seat thereafter slidably positioned forward, thereby positioning the folded, tipped seat forward nearest the front row seats to create more space for ingress/egress to a third row of seats.

The folding, sliding, tipping, and/or other articulating functions of these disclosed seat designs may be implemented with manual releases and manual and/or spring-assisted positioning of the seat components, or powered actuators with manual and/or spring-assisted positioning of the seat components, and/or fully powered actuation and positioning of the seat components, depending upon customer preference.

These and other aspects of the disclosure will be more fully explained with reference to the attached drawings and the following detailed description.

BRIEF DESCRIPTION OF THE DRAWINGS

FIG. 25 is a side view of the seat frame of FIG. 22 with the seatback in an advanced stage of folding forward and the seat base in its initial stages of pivoting rearward and downward;

FIG. 26 is a side view of the seat frame of FIG. 22 showing the seat base fully pivoted rearward and downward and the seat in its stow position;

FIG. 27 is a partial side view of the seat frame of FIG. 22 with the seatback in the folded position and the drive linkage locked;

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
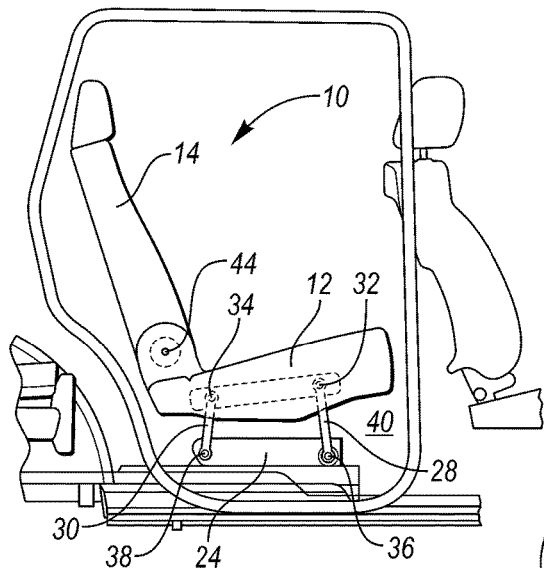
FIG. 1 is a side partial cross-sectional view of an embodiment of the foldable vehicle seat in its use position.
Figure 2:
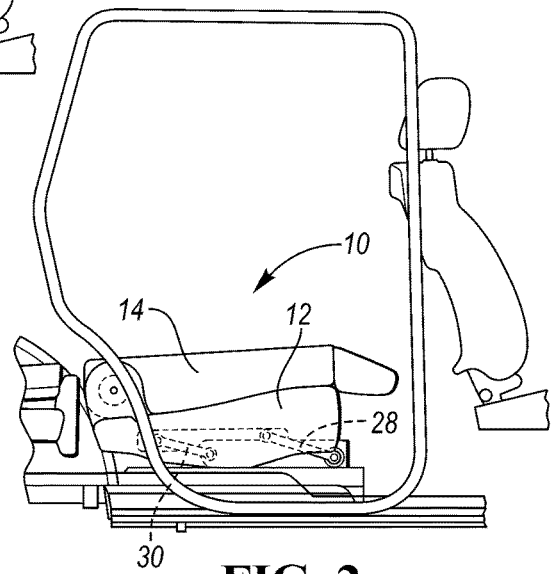
FIG. 2 is a side partial cross-sectional view of the foldable seat of FIG. 1 folded into the stow position.
Figure 3:
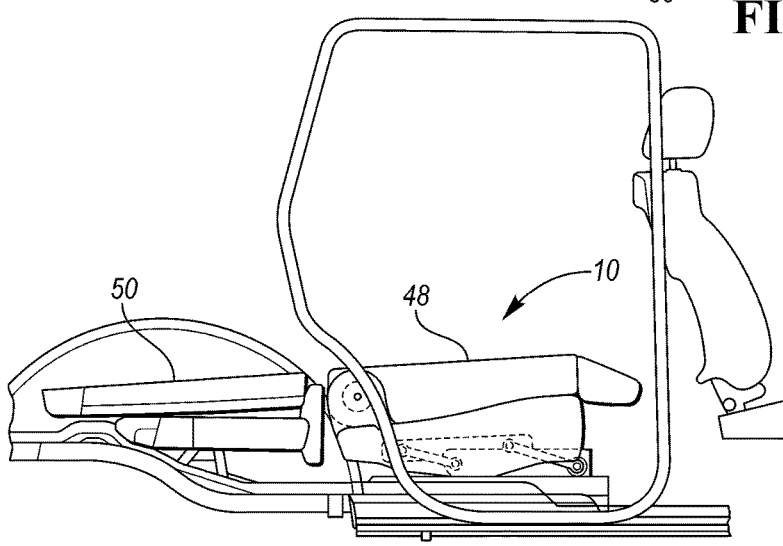
FIG. 3 is a side view of the foldable seat of FIG. 1 mounted as a second row seat deployed in the stow position adjacent a third row seat also deployed in the stow position.
Figure 11:
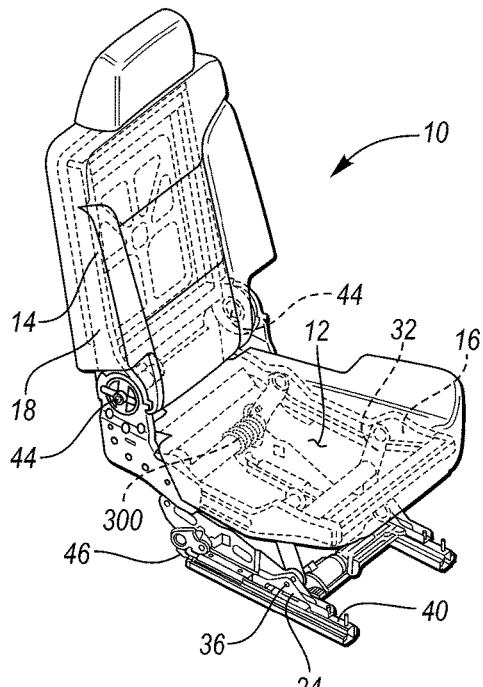
FIG. 11 is a perspective view of another embodiment of the foldable seat.
Figure 12:
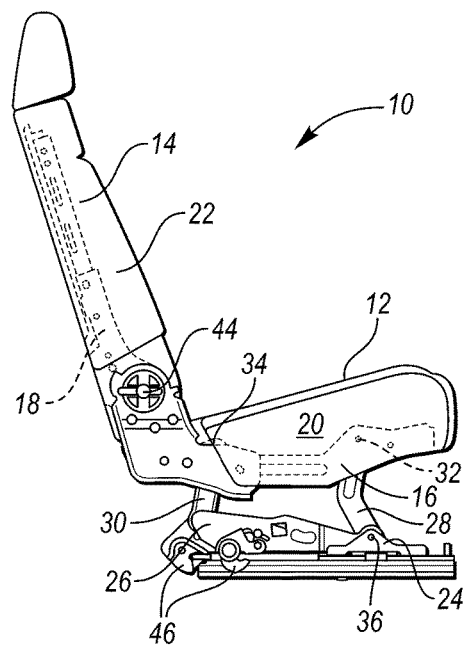
FIG. 12 is a side view of the seat of FIG. 11.

Referring now to FIGS. 1-3, the disclosed seat, generally designated as 10, includes a seat base 12, and a backrest or seatback 14 mounted for pivotal rotation relative to the seat base 12. The seat base 12 and seatback 14 may each include a rigid frame 16, 18 and one or more foam cushions 20, 22 (as best shown in FIGS. 11 and 12), for aesthetics and for the comfort of seated occupants. The seat base 12 and seatback 14 may also be upholstered with leather, fabric, or other desired materials. The seat 10 may be configured as a bench-type seat (as depicted in the embodiment of FIGS. 1-9), or as a bucket-type (as depicted in the embodiment of FIGS. 11 and 12), and may be sized to accommodate any number of occupants.

The seat base frame 16 is secured, directly or indirectly, to the vehicle floor. In the disclosed embodiments, the seat base frame 16 is pivotally attached to one or more base brackets 24, via one or more links 28, 30. In the illustrated embodiments, the seat base frame 16 is pivotally attached on each side of the seat to a front link 28 and a rear link 30 at the upper ends of the links 28, 30 with conventional pivot pins 32, 34. Each of links 28 and 30 are also pivotally attached at their lower ends to base brackets 24 and 26 (shown in FIG. 12), again with conventional pivot pins 36, 38. As a result, the seat base frame 16 may be moved relative to the vehicle floor by rotating links 28 and 30. In particular, the seat base frame 16 is positionable between a seating position (shown in FIG. 1), wherein the links 28, 30 are generally perpendicular to the seat base frame 16 and the vehicle floor, and a stowed, generally flattened position (shown in FIG. 2) wherein the links 28, 30 are generally nearly parallel to the seat base frame 12 and the vehicle floor.

Each of the disclosed embodiments may also employ one or more conventional seat adjustment (i.e., recliner) mechanisms 44 which separately provide the capability of adjusting the inclination of the seatback 14 to various desired positions. It is contemplated that the disclosed seat stowage and return system control would be integrated with the associated inclination adjustment mechanisms so that the inclination adjustment mechanisms 44 are first unlocked upon activation and movement of the seatback to the folded-over position and, if desired, thereafter locked upon completion of the stowage/return operation.

Figure 15:
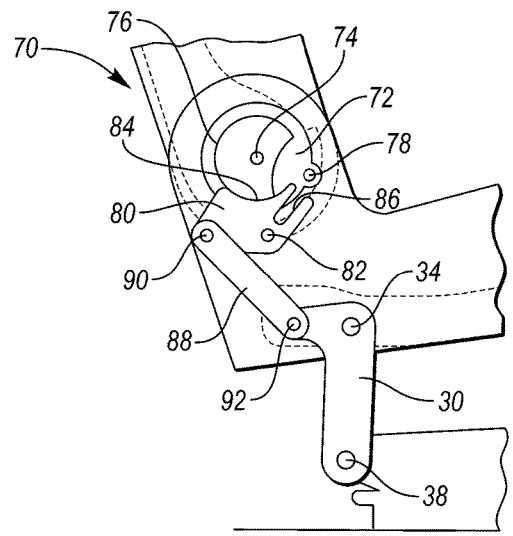
FIG. 15 is a partial side view of the seat of FIG. 14 showing the modified Geneva drive linkage.
Figure 23:
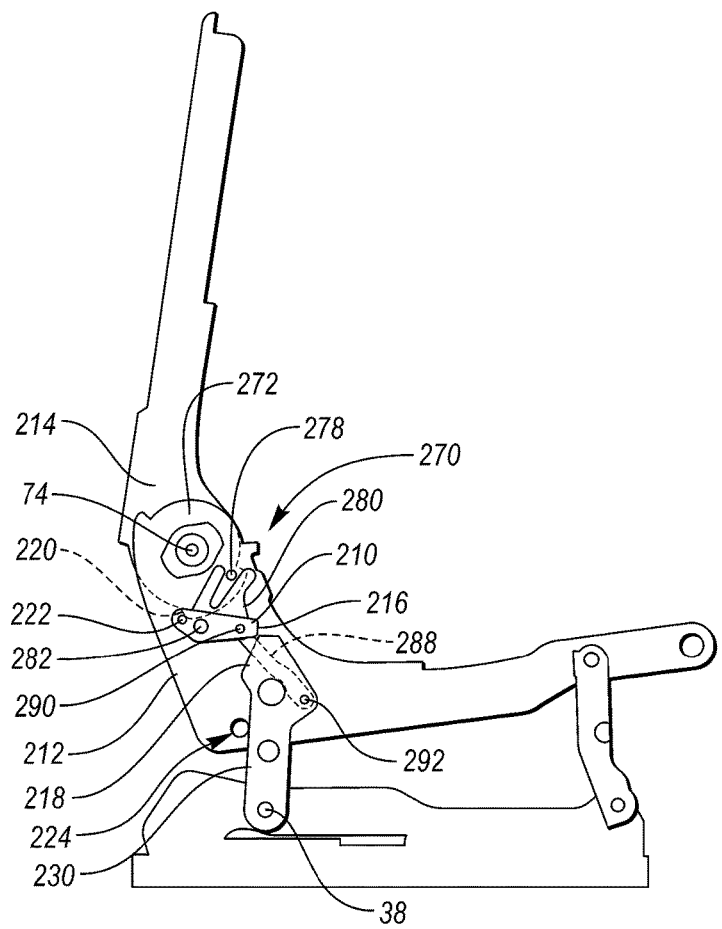
FIG. 23 is a partial side view of the seat frame of FIG. 22 showing another embodiment of the drive linkage in an unlocked condition.

Each of the disclosed embodiments may also employ a lock mechanism which may be engaged to lock one or more of the pivotal links 28, 30 in place, such as, for example, to thereby lock the seat base in its use position. The lock mechanism may then be disengaged, as and when desired, to facilitate movement of the seat base to, for example, its stow position. The lock mechanism may be any one of a variety of conventional locks (e.g., cam/pawl/sector, hook and pin, or shear pin types), or the lock mechanism may be integrated into one of the disclosed embodiments of the seat drive mechanisms, as shown in FIGS. 15 and 23, and as further described hereinafter.

In the disclosed embodiments, brackets 24 and 26 on each side of the seat may each be slidably mounted on one or more conventional seat track assemblies 40, 42, such that brackets 24, 26, and, thereby, seat 10, may be slidably positioned in the fore and aft directions (best shown in FIG. 11). It will be appreciated that conventional seat track assemblies may be employed, which may include manual and/or powered positioning and locking/unlocking capabilities.

Referring to FIGS. 11 and 12, brackets 24, 26 may be secured at the rear of the seat via one or more releasable latches 46, such that, upon release of the latches 46, the rear portion of the seat base frame 16 may be detached from the vehicle floor/tracks to allow the rear portion of the seat to move upward and forward, as the front links 28 rotate about front pivot pins 36 (as is best in FIGS. 9 and 13) as hereinafter described in further detail.

Referring again to FIGS. 1 and 3, it will be appreciated that the disclosed embodiments of seat 10 provide the capability to fold the seat from its use position to a stow position in which the rear face 48 of the seatback 14 provides a low profile load floor. When provided with a folding third row seat 50, such as the type best shown in FIGS. 3 and 13 (and described in greater detail in Applicant's U.S. Application Ser. No. 62/188,123, for a "STOWABLE VEHICLE SEAT WITH SLOTTED GUIDE LINKAGE"), the disclosed seat may be folded to form a nearly flat load floor that is co-planar with the load platform formed by the folded third row seat. It should be appreciated that the rearward and downward positioning of the seat base, as the seat is moved from its use to its stow position, minimizes the gap between the load platform formed by the folded seatback and seat base and the folded third row seat, and maximizes the space between the second and front row seats, thereby maximizing front row seat fore-aft adjustability.

The kinematic sequence associated with folding the seat 10 for the embodiments of the seat shown in FIGS. 1 and 11 from its use position to its stow position will now be described with particular reference to FIGS. 1, 4-6, and 2. FIG. 1 illustrates the seat 10 in a typical use position. In use, recliner mechanisms 44 will be locked to prevent movement of the seatback 14 relative to the seat base 12. Links 28 and 30 will similarly be locked in position to prevent movement of the seat base 12 relative to mounting brackets 24, 26. Brackets 24, 26 will similarly be locked in position in seat tracks 40, 42 to prevent any fore/aft movement of the seat while in its use position.

Figure 4:
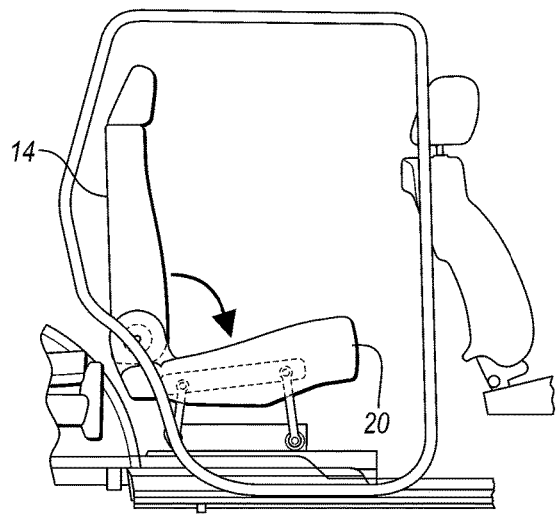
FIG. 4 is a side partial cross-sectional view of the seat of FIG. 1 with the seatback folded over the seat base.
Figure 5:
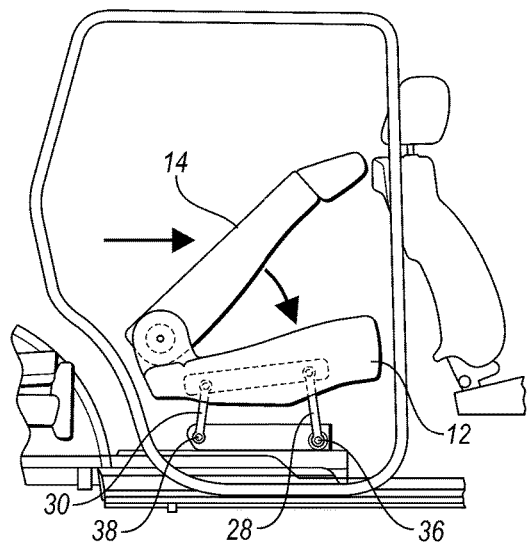
FIG. 5 is a side partial cross-sectional view of the seat of FIG. 1 with the seatback in its folded position and the seat slidably positioned forward on the seat tracks.

When it is desired to fold the seat from its use position to its stow position, a first actuation (by operation of a lever, pushbutton, or other actuating device) of the seatback 14 causes the recliner mechanisms 44 to unlock, thereby allowing the seatback to fold forward (either by manual operation, spring-assist, and/or motor-powered assist) onto the seat base cushion 20, as shown in FIG. 4. The motion of the seatback folding forward triggers the fore/aft seat track locks to disengage, and the seat base slides forward (again by manual operation, spring-assist, and/or motor-powered assist), placing the now folding seat in a relatively forward position on the seat tracks, as shown in FIG. 5. Upon reaching the forward track position, the seat track locks may be re-engaged.

Figure 6:
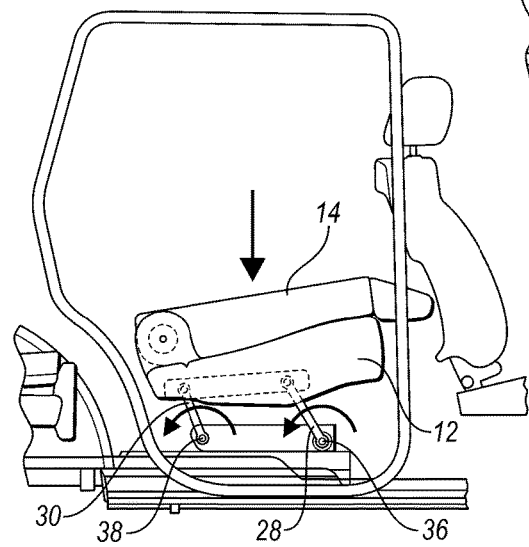
FIG. 6 is a side partial cross-sectional view of the seat of FIG. 1 showing the seat base in its initial stages of pivoting rearward and downward.

As shown in FIG. 6, the motion of the folded seat in the forward position on the seat tracks triggers disengagement of the lock mechanism which otherwise secures the links 28, 30 in position, and the links rotate counter-clockwise about pivot pins 36, 38 (when viewed from the right side of the seat as shown in FIGS. 6 and 12), thereby causing the seat base 12 and folded seatback 14 to move rearward and downward (again by manual operation, spring-assist, and/or motor-powered assist) until the seat reaches the fully folded stow position shown in FIG. 2. Alternatively, the fold-to-stow sequence may be implemented to require that links 28, 30 be unlocked (and the seat base 12 be allowed to move rearward and downward from the use position) only after the seat base 12 has moved to the forward position and the seat track locks may be re-engaged.

The sequence for restoring the seat to its use position is generally reversed from the above-described sequence, except that, whether implemented by manual or powered actuation, the locks which secure links 28, 30 in the use position should be engaged prior to releasing the backrest for movement to its use position, to ensure that the seat cannot be unfolded and occupied until the seat base 12 is locked in an upright position. One of several known seat track "memory" mechanisms may be employed to provide for an automatic return of the seat to the fore/aft position, or the seat may be designed to be left in its full forward position once it has been unfolded, thereby requiring the occupant to re-position the seat.

FIGS. 14-18 illustrate another embodiment of the disclosed seat which utilizes a modified Geneva drive mechanism which allocates the force of lowering the back rest (when the set is moved from its use to its folded position) to simultaneously unlock the pivot links (also referred to herein as support legs) 28, 30 of the seat base 12 and rotate the seat base 12 rearwardly and downwardly to the folded position.

Referring now to FIG. 15, the modified Geneva drive linkage mechanism, generally referred to as 70, includes a drive member, in the form of a drive pin and lock cam 72, which is mounted (or made integral with the seatback frame) for rotation with the seatback 14 about the seatback's pivot axis 74. The pin and lock cam includes a cam surface 76 in the form of a portion of a circle and a drive pin 78. A slotted linkage member, such as modified Geneva plate 80, is pivotally mounted on the seat base frame by pivot 82. The plate 80 includes a generally arcuate concave cam surface 84 and a drive slot 86.

The plate 80 is sized and positioned such that as the pin and lock cam 72 is rotated in any range of inclinations for which the lock cam surface 76 engages the complimentary cam surface 84 on the plate 80, the plate 80 is prevented by the engaging cam surfaces 76, 84 from pivoting about its pivot 82. The engagement of surface 76 on the lock cam 72 and cam surface 84 on the plate 80 thus prevents rotation of the plate 80, thereby preventing movement of support leg 30 (and the seat base) for so long as cam surfaces 76, 84 are engaged. Thus, in this embodiment, the drive linkage mechanism 70 includes an integral lock mechanism which prevents movement of the seat base 12 during a portion of the rotation of the seatback 14 and unlocks to allow movement of the seat base 12 simultaneously with another portion of the rotation of the seatback 14.

The pin and lock cam 72 may also include one or more connecting links, such as link 88, which, in the embodiment shown in FIGS. 14-18, is pivotally connected to the plate 80 by pivot pin 90 at its upper end, and is pivotally connected to one of the rear support legs 30 by pivot pin 92 at its lower end.

Figure 17:
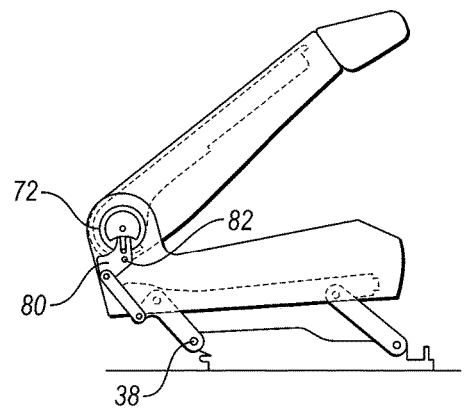
FIG. 17 is a side view of the seat of FIG. 14 with the seatback in an advanced stage of folding forward and the seat base in its initial stages of pivoting rearward and downward.
Figure 18:
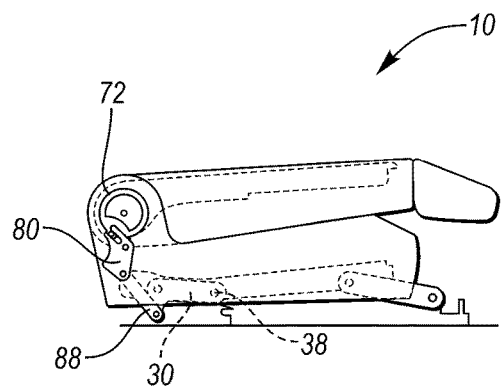
FIG. 18 is a side view of the seat of FIG. 14 showing the seat base fully pivoted rearward and downward and the seat in its stow position.

As the seatback 14 and pivot and lock cam 72 are rotated such that the cam surface 76 rotates out of engagement with the complimentary cam surface 84 of the plate 80 (as shown in FIG. 17), the plate 80 is thereby unlocked for pivotal movement about its pivot 82. Rotation of the pin and lock cam 72 causes the drive pin 78 to move within slot 86 on the plate 80 and drive plate 80 to rotate the plate about its pivot 82 for a desired portion of a range of rotation of the pin and lock cam 72. Thus, in the illustrated embodiment of FIG. 15 clockwise rotation of the pin and lock cam 72 (which is achieved by forward, or clockwise as shown in the figure, rotation of the seatback 14) results in rotation of the pin and lock cam 72 until cam surfaces 76 and 84 are not engaged (such as is shown in FIG. 17). Drive pin 78 is then positioned within slot 86 to rotate the plate counter-clockwise about its pivot 82 (as shown in FIGS. 17 and 18). This counter-clockwise rotation of the plate 80 results in a downward motion of the connecting link 88 which pushes cushion support leg 30 at pivot 92 to thereby rotate cushion support leg 30 counter-clockwise about its pivot 38, thereby causing support leg 30 to move the seat base 12 rearward and downward toward its folded (stow) position.

Figure 19:
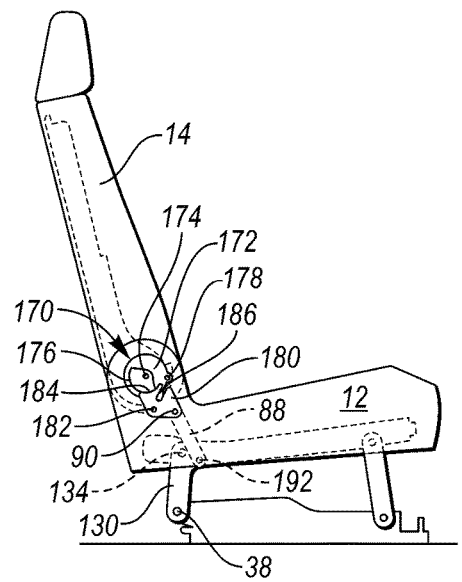
FIG. 19 is a side view of a fourth embodiment of the foldable seat.
Figure 20:
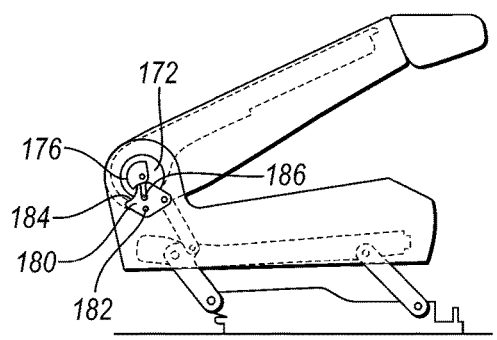
FIG. 20 is a side view of the seat of FIG. 19 with the seatback in an advanced stage of folding forward and the seat base in its initial stages of pivoting rearward and downward.
Figure 21:
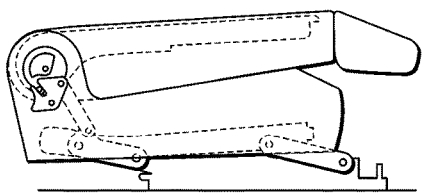
FIG. 21 is a side view of the seat of FIG. 19 showing the seat base fully pivoted rearward and downward and the seat in its stow position.

Another embodiment of the disclosed seat, shown in FIGS. 19-21, employs an alternate embodiment of a modified Geneva drive linkage mechanism 170. Referring to FIG. 19, in this embodiment, the slotted linkage member, in the form of plate 180, is shaped such that the connecting link 88 is pivotally attached to the plate 180 at a location forward of the plate pivot 182. Similarly, the support leg 130 is shaped such that the pivotal connection between the connecting link 88 and support leg 130 (at pivot 192) is located forward of the pivot 134 connecting the support leg 130 to the seat base 12. In this arrangement, the counter-clockwise rotation of the plate 180 (such as during the downward and forward folding of the seatback 14) pulls the connecting link 88 upward, which in turn pulls support leg 130 and rotates it counter-clockwise, thereby moving the seat base 12 rearward and downward to its stow position.

Referring now to the embodiments of both FIGS. 15 and 19, it should be appreciated that the length and orientation of the cam surface 76, 176 of the pivot and lock cam 72, 172 may be varied to obtain locking engagement of the cam surfaces with the complimentary cam surface 84, 184 of the plate 80, 180 over the desired range of rotation of the backrest 14 in its use position. Similarly, the pivot and lock cam 72, 172 may be oriented to achieve an "unlock" position to initiate folding movement of the seat base 12 at the desired angle of forward rotation of the backrest 14. Thus, by utilizing the modified Geneva drive mechanism 70, 170 and varying the length orientation of the cam surfaces 76, 176 and 86, 186, respectively, of the pivot and lock cam 72 and the plate 80, the seat base lock mechanism may be activated and de-activated, and an actuating force applied on one seat component (e.g., the seatback) can be transmitted to a second component (e.g., the seat base), over various combinations and ranges of movement of each of the components to achieve varying combinations of desired coordinated motions of the interconnected components.

Figure 14:
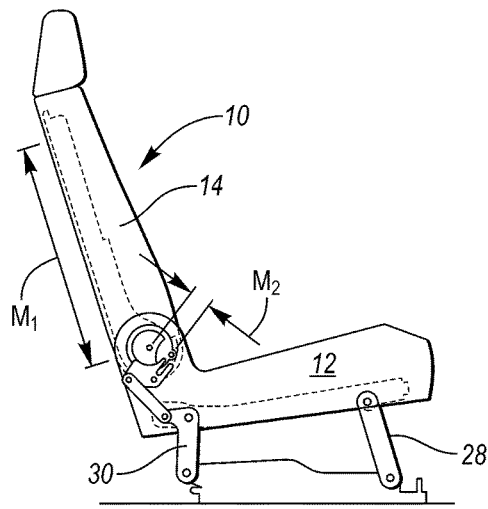
FIG. 14 is a side view of a third embodiment of the foldable seat.

The kinematic sequence associated with folding the seat for each of the embodiments of the seat shown in FIGS. 14 and 19 from its use position to its stow position will now be described with particular reference to FIGS. 14-18 and 19-21. FIGS. 14 and 19 each illustrates a different embodiment the seat in a typical use position. As with the previously described embodiments, in its use position the recliner mechanisms 44 will be locked to prevent movement of the seatback 14 relative to the seat base 12. Links 28 and 30 (and 130) are similarly locked in position by the engaged cam surfaces 76 and 84 (and 176 and 184) to prevent movement of the seat base 12 relative to the mounting brackets (such as those shown as 24, 26 in FIG. 12). The mounting brackets may similarly be locked in position in seat tracks (such as those shown as 40, 42 in FIG. 12) to prevent any fore-aft movement of the seat while it is in its use position.

Figure 16:
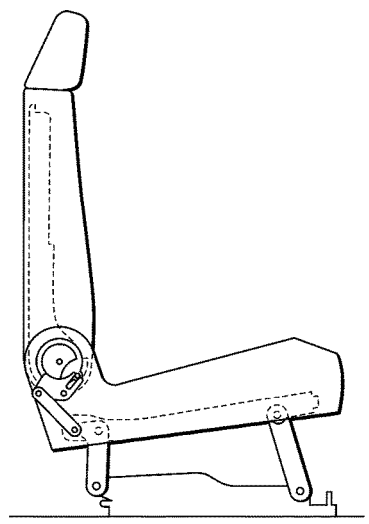
FIG. 16 is a side view of the seat of FIG. 14 with the seatback position slightly forward in its initial stages of folding into the stow position.

When it is desired to fold the seat from its use position to its stow position, a first actuation (again by operation of a lever, push button, or other actuating device) of the seatback 14 causes the recliner mechanisms 44 to unlock, thereby allowing the seatback to fold forward (again either by manual operation, spring-assist, and/or motor-powered assist) onto the seat base cushion 20, as shown in FIGS. 18 and 21. It should be appreciated that, as best shown in FIG. 15, when the seatback is in its use position and in the initial stages of being folded forward (such as is shown in FIG. 16) the outer arcuate surface 76, 176 of the lock cam contacts the inner top arcuate surface 84, 184 of the plate 80, 180, thereby preventing the plate 80, 180 from rotating, and thereby locking connecting link 88, and the rear support leg 30, 130 to which it is connected, in place. Thus, until the seatback 14 has been rotated to a desired tilt (e.g., a non-use) position, the seat base 12 is locked in its use position. This allows the seat base 12 to remain locked in its use position while the seatback 14 is adjusted for reclining/comfort, but unlocks the seat base 12 (allowing it to move to the stow position) as the seatback 14 is moved into its non-use (stow) position.

Referring now to FIGS. 17 and 20, as the seatback 14 is further rotated forward, the contacting surface 76, 176 of the lock cam 72, 172 rotates out of contact with the plate 80, 180. Also, as the seatback 14 is further rotated forward, the drive pin 78, 178 enters the drive slot 86, 186 on the plate 80, 180 and causes the plate 80, 180 to rotate counter-clockwise about its mounting pin 82, 182. In the embodiment of FIGS. 14-18, the rotation of the plate 80 causes a downward and forward motion of the connecting link 88, which thereby causes a counter-clockwise rotation of the rear support leg 30. Thus, by rotating the seatback 14 forward (i.e., clockwise as shown in the figures), the seatback 14 is urged into its flattened stow position and, simultaneously, the seat base support legs 30, 28 are rotated counter-clockwise, thereby causing the seat base 12 to move downward and rearward to its stow position.

Referring now to the embodiment of FIGS. 19-21, while the kinematic sequence and operation of moving this embodiment of the seat to its stow position is similar to that described above in connection with the embodiment of FIGS. 14-18, the plate 180 and support leg 130 have been redesigned in this embodiment. In particular, the plate 180 in the embodiment of FIG. 19 has been shaped to provide the pivoting connection of the connecting link 88 with the plate 180 at a position forward of the pivot point 182 of the plate 180. In addition, the support leg 130 has been shaped in this embodiment to provide the location of the pivoting connection 192 between the connecting link 88 and the support leg 130 forward and downward of the pivoting connection 134 between the support leg 130 and the seat base 12. With this embodiment, as the seatback 14 is rotated forward to the extent that the lock cam 172 is moved out of locking contact with the plate 180 (in FIG. 20), the further rotation of the seatback 14 causes a counter-clockwise rotation of the plate 180 about its pivot 182, thereby pulling the connecting link 88 upward and rearward creating a tensile force which then rotates the unlocked rear support leg 130 counter-clockwise, thereby causing the seat base 12 to move downward and rearward to its stow position (shown in FIG. 21) as the seatback 14 is folded over the seat cushion.

For each of the embodiments of FIGS. 14 and 19, the sequence for restoring the seat to its use position is generally reversed from the above-described sequence. As the seatback is unlocked and rotated upward towards its use position, the drive pin 78, 178 rotates the plate 80, 180, now clockwise, which in turn pulls the connecting link 88 (in the embodiment shown in FIG. 17) or pushes the connecting link 88 (in the embodiment shown in FIG. 20) which in turn, rotates the rear cushion support leg 30, 130 in a clockwise direction, thereby pulling the seat base 12 forward and upward as the seatback 14 rotates rearward (i.e., counter-clockwise) to its use position.

It will be appreciated that for the embodiments shown in FIGS. 14 and 19, as the seatback 14 is raised (i.e., rotated counter-clockwise) towards its use position, once the outer surface 76, 176 of the lock cam 72, 172 contacts the upper inner surface 84, 184 of the plate 80, 180, the plate 80, 180, connecting link 88, and cushion support leg 30, 130 are locked from further movement, thereby locking the seat base 12 in its use position, while allowing for further rotation of the seatback 14 to a desired use inclination.

Another embodiment of the disclosed seat, shown in FIGS. 22-27, employs another alternate embodiment of a drive linkage mechanism 270. As with the drive mechanisms illustrated in FIGS. 15 and 19, drive mechanism 270 employs a drive member, in the form of a rotating drive plate 272 which is integrated into or mounted for rotation with the bottom portion of the seat back frame 214 about the seat back's pivot axis 74. The rotating drive plate 272 includes a drive pin 278. A slotted linkage member, in the form of a slotted bell-crank 280, is pivotally mounted on the seat base frame 212 by pivot 282.

Figure 22:
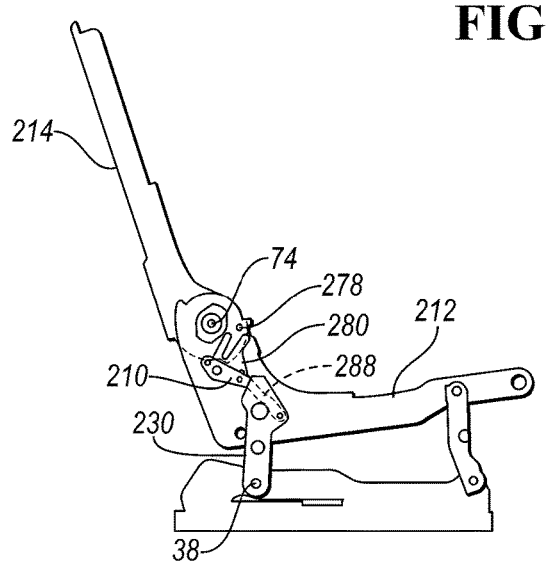
FIG. 22 is a side view of the seat frame of a fourth embodiment of the foldable seat.
Figure 24:
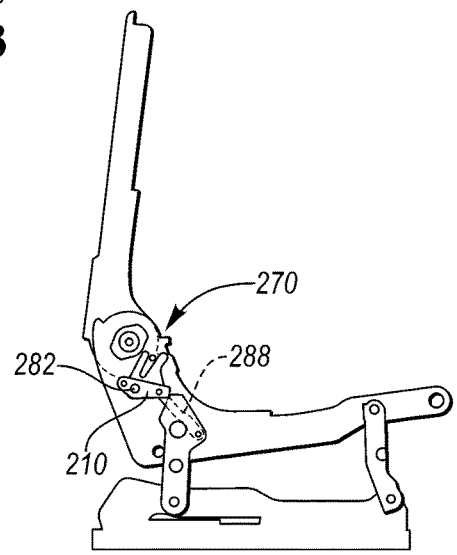
FIG. 24 is a side view of the seat frame of FIG. 22 with the seatback position slightly forward in its initial stages of folding into the stow position.

This embodiment also includes an integral lock mechanism which prevents movement of the seat base 212 during a portion of the rotation of the seatback 214, and unlocks to allow movement of the seat base 212 simultaneously with another portion of the rotation of the seatback 214. The slotted bell-crank 280 is sized and positioned such that as the drive plate 272 is rotated in any range of inclination for which it is desirable that the seat base 212 be locked in position (e.g., the use position) a rotating lock cam 210 is positioned such that cam surface 216 is in abutting contact with a cam surface 218 located on support leg 230, thereby locking support leg 230 from pivotal movement about its pivot 38. Lock cam 210 is also pivotally mounted for rotation about pivot 282 such that lock cam 210 may be rotated from one or more non-interference positions (such as shown in FIGS. 23-27) whereby support leg 230 is free to rotate about pivot 38 while, for example, moving the seat base to or from its use to its stow position, to an interference position (such as shown in FIG. 22) whereby the locking cam surface 216 of lock cam abuts the locking cam surface 218 on the support leg 230, to thereby lock the support leg 230 from rotation about its pivot 38 and, thus, lock the seat base in, for example, an upright use position (shown in FIG. 22).

As with the previously disclosed drive linkage embodiments, this embodiment may include one or more connecting links, such as link 288. In the embodiment of FIGS. 22-27, link 288 is pivotally connected to the slotted bell-crank 280 by pivot pin 290 at its upper end, and is pivotally connected to rear support leg 230 by pivot pin 292 at its lower end.

Drive plate 272 is provided with at least one cam surface 220 which interacts with drive pin 222 located on lock cam 210 as hereinafter described to urge lock cam 210 to and from its locking and unlocking positions.

As seat back 214 and drive plate 272 are rotated such that cam surface 220 of the rotating plate 272 contacts pin 222, lock cam 210 is rotated in a counter clockwise direction about pivot 282 (shown in FIG. 23), from its locking orientation (shown in FIG. 22) to an unlocking orientation (shown in FIGS. 23-27).

Rotation of drive plate 272 also causes drive pin 278 to move within slot 286 on the bell-crank 280 and drive the bell-crank 280 to rotate about its pivot 282 for a desired portion of a range of rotation of plate 272. Thus, in the illustrated embodiment of FIG. 23, clockwise rotation of plate 272 (which is achieved by forward, or clockwise as shown in the Figure, rotation of the seat back 214) results in rotation of plate 272 until lock cam 210 is no longer engaged on cam surface 216, thereby unlocking rear support leg 230 for pivoting movement. Drive pin 278 is then positioned within slot 286 to rotate the bell-crank 280 counter clockwise about its pivot 282 (as shown in FIGS. 23-26). This counter clockwise rotation of the bell-crank 280 results in an upward motion of the connecting link 288, which pulls support leg 230 at pivot 292 to thereby rotate support leg 230 counter clockwise about its pivot 38, thereby causing the support leg to move the seat base 212 rearward and downward toward its folded (stow) position.

As with the other embodiments, the kinematic sequence and operation of moving this embodiment of the seat from its stow position to its use position is generally reversed from the above-described sequence. As the seat back 214 is rotated upward toward its use position, engagement of drive pin 278 within slot 286 causes clockwise rotation of bell-crank 280. This rotation of bell-crank 280 in turn pulls connecting link 288 downward and forward, driving support leg 230 to rotate in a clockwise fashion about pivot 38, thereby moving seat base 212 forward and upward toward its use position. As seat back 214 is rotated to near its use position (such as is shown in FIG. 23) drive pin 222 rides along surface 220 of drive plate 272, thereby allowing lock cam 210 to rotate clockwise from its unlocked position into an interference position (shown in FIG. 22) whereby a locking surface 216 of lock cam 210 is in abutting engagement with locking surface 218 of support leg 230, thereby locking support leg 230 and preventing it from rotation about pivot 38. An additional stop pin 224 is provided on seat base 212. As shown in FIG. 23, pin 224 engages and constrains support leg 230 in the desired locked, upright position when the seat base 212 is in the use position. As shown in FIG. 27, pin 224 also engages and constrains support leg 230 at surface 218 when the seat base 212 is moved to the stow position.

Utilizing the modified Geneva drive linkage assembly 70, 170 as shown in the embodiments of FIGS. 14 and 19, or the alternate drive linkage assembly shown in FIG. 22, allows the seat to be moved from its use position to its stow position (and vice versa) with a single operation—rotation of the back rest 14, 214 forward and downward (or upward and rearward), to effectuate the repositioning of both the seatback and the seat base in a single, integrated step. Also, since the moment arm $M_1$ for the force supplied by an operator when manually rotating backrest 14, 214 (shown in FIG. 14) is considerably longer than the moment arm, $M_2$, which transmits the force to pivot the seat cushion support leg 30, 130, the utilization of any of these drive linkages in a manually foldable seat provides a mechanical advantage resulting in relatively lower force being required to effectuate movement of both the seatback 14, 214 and seat base 12, 212 to and from their respective use and stow positions. In addition, one or more spring elements (such as, for example, spring 300 in FIG. 11) may be added to assist in the movement of one or more of the movable components (e.g., the seatback or the seat base) over some portion of the range of motion of those components as they are moved to or from the various disclosed stow, fold & tilt, and/or tilt positions.

As with the other disclosed embodiments, for each of the embodiments shown in FIGS. 14, 19, and 22, the seat may be mounted on one or more seat track assemblies for slidable fore-aft movement of the seat. The seat may be configured such that the motion of the seatback folding forward also triggers the fore/aft seat track locks to disengage, allowing the seat to slide forward (again by manual operation, spring-assist, and/or motor-powered assist), thereby placing the now folding seat in a relatively forward position on the seat tracks, to avoid interference with a $3^{rd}$ row seat or the load floor immediately rearward of the seat as the seat base 12 is folding rearward. Again, as with the other disclosed embodiments, upon reaching the forward track position, the seat track locks may be re-engaged.

In the disclosed embodiments, the seat may be outfitted with known manual or powered actuators (not shown) which may be operated to unlock and/or move the seat base and seatback from their use position to one of several stowage and/or ingress/egress positions. The release mechanisms themselves may be manual, such as, for example, conventional release cables activated by pull latches. Alternatively, the release/actuating mechanisms may themselves be powered, with manual (or spring-assisted) repositioning of one of more of the seat components required after powered release. Alternatively, or additionally, actuation and re-positioning of the seat components may be partially or fully powered such that, for example, the seat folds from its use position to the stow position with the push of a button.

One example of a powered stowable vehicle seat is disclosed in pending U.S. application Ser. No. 14/707,256, for "Powered Stowable Vehicle Seat and Associated Seat Frame Assembly", filed May 8, 2015, the disclosure of which is hereby incorporated by reference herein to the extent that such power/drive designs may be integrated to provide power-assist to position the seat base 12, 212 and/or the seatback 14, 214 of the disclosed embodiments as described herein.

Figure 7:
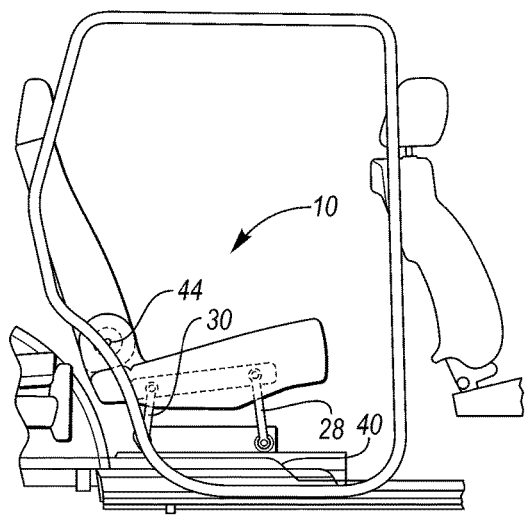
FIG. 7 is a side partial cross-sectional view of the seat of FIG. 1 in its use position.

The kinematic sequence associated with tilting the seat 10 from its use position and sliding the seat to a forward position to provide additional space for ingress/egress to rearward seats (such as the third row seat best shown in FIGS. 3 and 13), will now be described with particular reference to FIGS. 7-9. FIG. 7 illustrates the seat 10 in a typical use position. Again, when in use, recliner mechanisms 44, links 28 and 30, brackets 24, 26, and the seat tracks 40, 42 will all be locked to prevent movement of the seatback 14, 214 relative to the seat base 12, 212, the seat base 12, 212 relative to mounting brackets 24, 26, and the seat 10 relative to tracks 40, 42 while the seat is in its use position.

Figure 8:
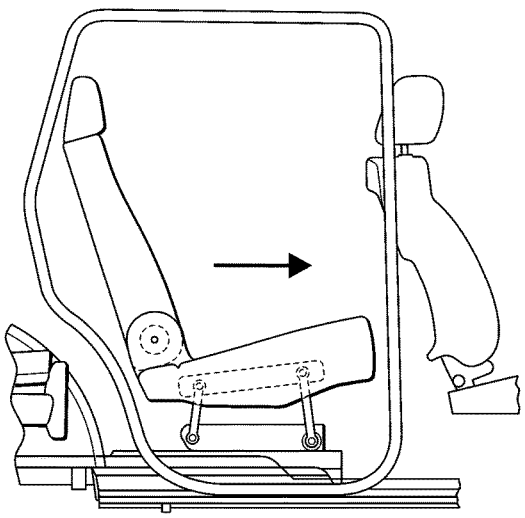
FIG. 8 is a side partial cross-sectional view of the seat of FIG. 1 showing with the seatback in its use position and the seat slidably positioned forward on the seat tracks.

When it is desired to move the seat from its use position to allow ingress/egress to/from the third row seats, a first actuation (by operation of a lever, pushbutton, or other actuating device) triggers the fore/aft seat track locks to disengage, and the seat base slides forward (again by manual operation, spring-assist, and/or motor-powered assist), moving the seat towards its full forward position on the seat tracks, as shown in FIG. 8. Upon reaching the forward track position, the seat track locks may be re-engaged.

Figure 9:
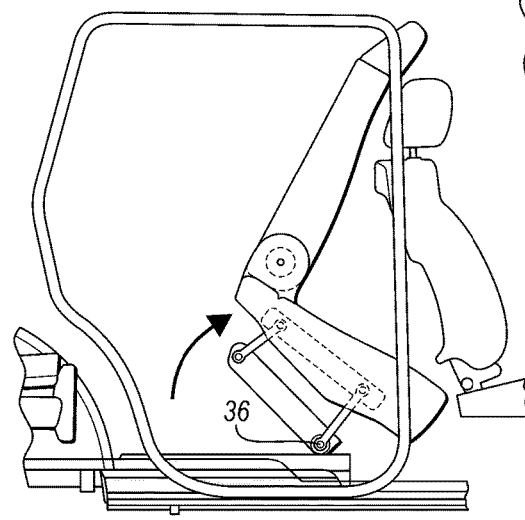
FIG. 9 is a side partial cross-sectional view of the seat of FIG. 1 showing the rear portion of the seat base released from the seat tracks, the seat fully pivoted forward and upward, and the seat in a tipped entry position.

As shown in FIG. 9 (and in FIG. 13 with respect to another disclosed embodiment), the motion of the seat in the forward position on the seat tracks triggers disengagement of latches 46 (best shown in FIG. 13), which otherwise secure the rear portion of the seat in position on the seat tracks 40, 42, and the seat rotates clockwise about pivot pins 36 (when viewed from the right side of the seat as shown in the figures), thereby causing the seat base 12, 212 and seatback 14, 214 to move forward and upward (again by manual operation, spring-assist, and/or motor-powered assist) until the seat reaches the forward, tilted ingress/egress position shown in FIG. 9.

Again, the sequence for restoring the seat to its use position is generally reversed from the above-described sequence, except that, whether implemented by manual or powered actuation, the locks which secure latches 46 to the seat tracks 40, 42 should be engaged prior to unlocking the seat tracks, to ensure that the seat cannot be moved until the seat base 12, 212 is locked in the seat tracks 40, 42. Again, although a seat track "memory" mechanism may be employed to provide for an automatic return of the seat to the fore/aft position, the seat may be designed to be left in its full forward position once it has been unfolded, thereby requiring the occupant to re-position the seat to a fore/aft position which provides leg room to now accommodate a third row seat occupant. In one embodiment, a sensor or other indicator may be provided to sense the condition of the latches 46 and provide a warning or other indication to the driver and/or occupants that the seat is in an unlocked condition anytime the latches have not been reengaged (i.e., the seat is not locked into its use position).

Figure 13:
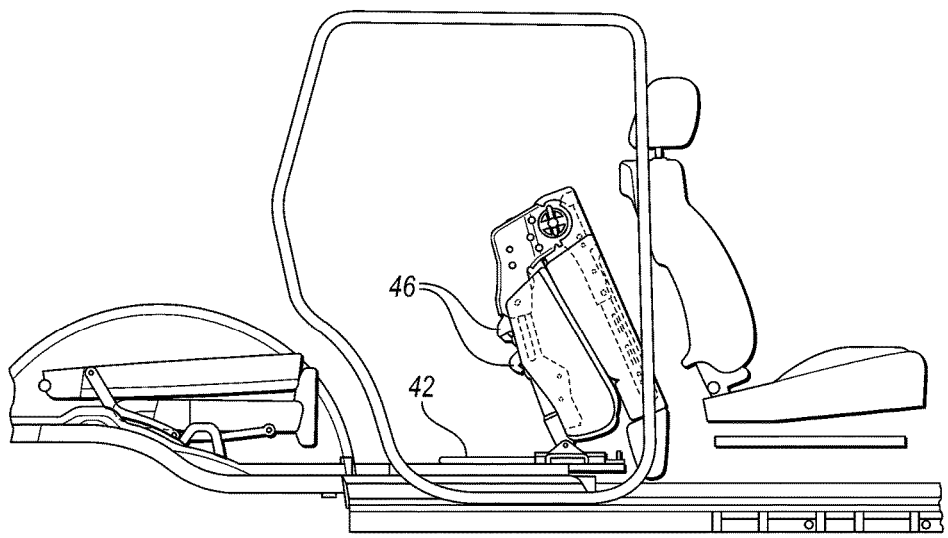
FIG. 13 is a side view of the seat of FIG. 11 installed as a second row seat, and in a folded and tipped entry position.

Each of the disclosed embodiments may alternatively or additionally be provided with the capability of folding into a conventional "fold and tumble" configuration, as shown in FIG. 13, to allow for stowage of the seat, and/or additional space for ingress/egress to/from a third row seat. The kinematic sequence associated with folding the seat 10 from its use position to its fold and tumble position will now be described with particular reference to FIGS. 1, 5 and 13.

FIG. 1 illustrates the seat 10 in a typical use position. Again, when in use, recliner mechanisms 44, links 28 and 30, brackets 24, 26, and the seat tracks 40, 42 will all be locked to prevent movement of the seatback 14 relative to the seat base 12, 212 the seat base 12, 212 relative to mounting brackets 24, 26, and the seat relative to tracks 40, 42 while the seat is in its use position.

When it is desired to fold the seat from its use position to its stow position, a first actuation (by operation of a lever, pushbutton, or other actuating device) of the seatback 14, 214 causes the recliner mechanisms 44 to unlock, thereby allowing the seatback to fold forward (either by manual operation, spring-assist, and/or motor-powered assist) onto the seat base cushion 20, as shown in FIG. 5. The motion of the seatback folding forward triggers the fore/aft seat track locks to disengage, and the seat base slides forward (again by manual operation, spring-assist, and/or motor-powered assist), placing the now folded seat in a relatively forward position on the seat tracks, as shown in FIG. 5. Upon reaching the forward track position, the seat track locks may be re-engaged.

Similar to the manner shown in FIG. 9, the motion of the seat in the forward position on the seat tracks triggers disengagement of latches 46, which otherwise secure the rear portion of the seat in position on the seat tracks 40, 42, and the folded seat rotates clockwise about pivot pins 36 (when viewed from the right side of the seat as shown in the figures), thereby causing the rear portion of the seat base 12, 212 and seatback 14, 214 to move forward and upward (again by manual operation, spring-assist, and/or motor-powered assist), while the front portion of the seatback and seat base pivot forward and downward, until the folded seat reaches the ingress/egress position shown in FIG. 13.

Again, the sequence for restoring the seat to its use position is generally reversed from the above-described sequence, except that, whether implemented by manual or powered actuation, the locks which secure latches 46 to the seat tracks 40, 42 should be engaged prior to unlocking the seat tracks or releasing the seatback for re-positioning, to ensure that neither the seatback nor the seat can be moved until the seat base 12 is locked in the seat tracks 40, 42. Again, although a seat track "memory" mechanism may be employed to provide for an automatic return of the seat to the fore/aft position, the seat may be designed to be left in its full forward position once it has been tipped back, locked in the seat tracks, and the seatback unfolded, thereby requiring the occupant to re-position the seat to a fore/aft position which provides leg room to now accommodate a third row seat occupant. Again, a sensor or other indicator may be provided to sense the condition of the latches 46 and provide a warning or other indication to the driver and/or occupants that the seat is in an unlocked condition anytime the latches have not been reengaged (i.e., the seat is not locked into its use position).

Figure 28:
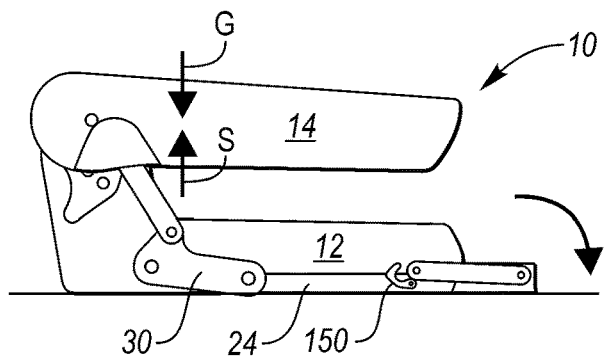
FIG. 28 is a side view of an embodiment of the foldable seat showing the seat in its folded position.
Figure 29:
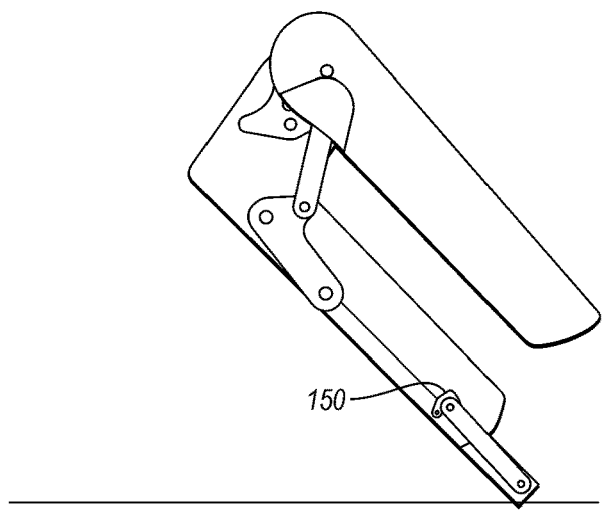
FIG. 29 is a side view of the seat of FIG. 28 showing the rear portion of the seat base released from the seat tracks and the seat in its initial stages of being tipped upward into its entry position.
Figure 30:
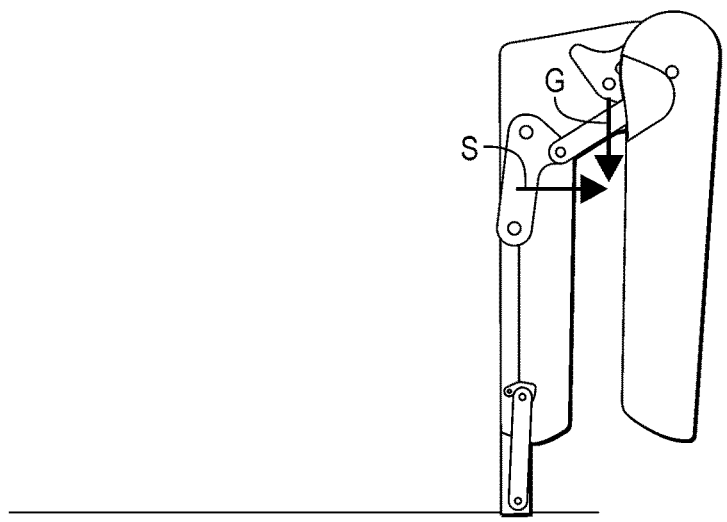
FIG. 30 is a side view of FIG. 28 showing the seat in a tipped entry position.

Referring now to FIGS. 28-30, when the seat 10 is in the stow position, the mass of the seat may be balanced with one or more spring elements (such as spring 300 shown in FIG. 11) fixed to one of the support legs 28, 30, 130 to minimize the lifting effort required to raise the seatback 14, 214 and seat base 12, 212. However, when the rear portion of the seat is disengaged to allow the seat base 12, 212 and seatback 14, 214 to pivot forward and upward as previously described (and as shown in FIGS. 9 and 13), the orientation of the spring force, S, relative to gravity, G, changes and the spring force, if unchecked may cause the seat to unfold as it is pivoted upward. Thus, a lock mechanism, such as latch 150, may be employed to lock one or more of the support legs 28, 30, 130 to prevent the support legs from pivoting relative to brackets 24, 26, thereby locking the seat in its folded position as it is tilted upward. Latch 150 may be actuated by a spring or cable that (1) moves the latch to its locked position when the rear portion of the seat is released from the seat tracks 40, 42, and (2) releases and unlocks the latch 150 when the rear portion of the seat is re-engaged in position on the seat tracks 40, 42.

Figure 10:
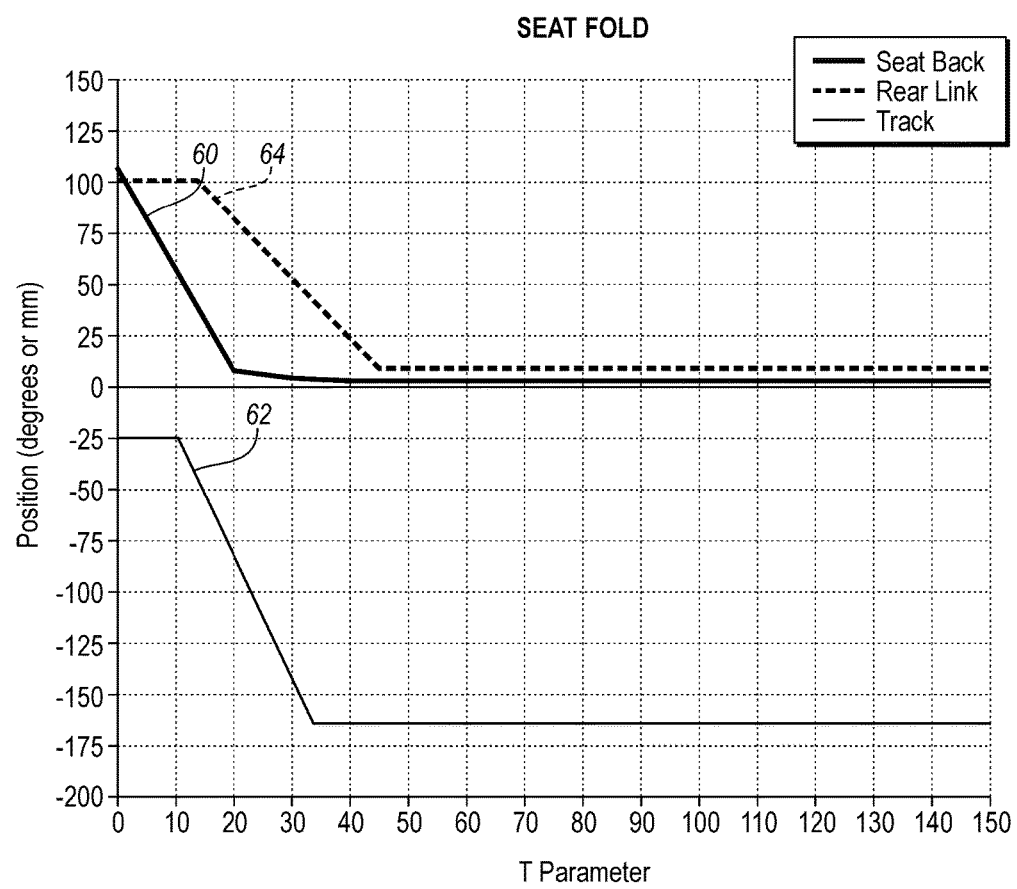
FIG. 10 is a timing chart illustrating a typical seat fold sequence.

FIG. 10 illustrates a timing chart which may be employed for the use-to-stow positioning of one embodiment of the disclosed seat 10 (of the types shown in FIG. 1 or 11), with x-axis component being units of time, and the y-axis component being displacement (degrees or millimeters). While the sequence and timing of occurrence of the movement of the seatback 14, seat base 12 along the seat tracks 40, 42, and seat links 28, 30, may be varied depending upon clearances between the first, second, and third row seats, the timing chart of FIG. 10 illustrates one typical folding sequence. Upon initiation of the use-to-stow folding sequence, the seatback 14 typically begins moving first, as evidenced by the sloping line at 60. Once the seatback 14 has moved far enough forward that it is, for example, out of its use position, the seat tracks are unlocked and the seat begins moving forward, as evidenced by the sloping line at 62. The links 28, 30 are thereafter unlocked, as evidenced by the sloping line at 64, and the seat base 12 begins its rearward and downward movement towards the full stow position as a result of the pivotal rotation of the links 28, 30.

Again, the timing of the initiation of the unlocking of the links 28, 30 relative to the timing of the movement of the seat forward in the seat tracks 40, 42 will be dependent upon how far forward the seat base 12 must be to ensure that the rearwardly collapsing seat base does not interfere with, for example, a similarly folded third row seat. As indicated in the example shown in FIG. 10, it is typically desirable to effectuate each of the required movements simultaneously, where possible, to shorten the time interval from "in use" to "stow" as much as possible, provided that each of the required motions occurs without interference with other interior components.

It should be appreciated that implementation of any of the disclosed embodiments provide several benefits in comparison to other folding seat designs. For example, use of any of the drive linkages of FIG. 15, 19, or 23 which provide for simultaneous movement of the seatback 14 and seat base 12 as the seat 10 is folded (i.e., "one-step" stowing) are beneficial to folding seat designs which require that the seatback and seat base be moved into separate steps, since the simultaneous downward and rearward movement of the seat base in these disclosed embodiments changes the movement arc of the headrest as the seatback is tilted forward, thereby reducing the likelihood that forward seats will interfere with the folding seatback/headrest, and similarly reducing the likelihood that for-aft movement of a forward seat will be required, as a rearward seat is moved to its stow position. A folding headrest may also be integrated into the disclosed designs to provide additional clearance for the seat with respect to a forward seat as the folding is moved from its use to its stow position.

Another advantage of these one-step drive linkages is that, when the seat is folded and tilted as, for example, shown in FIG. 13, the rearward and downward collapse of the seat base "folds" the riser assembly closer to the seat base, resulting in greater space between the folded and tilted seat and any rearward seats (such as shown in FIG. 13), making ingress and egress easier. This folded riser assembly also improves aesthetics in that less of the riser assembly components are protruding from the folded and tilted seat.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A foldable vehicle seat mounted on a floor support in a vehicle, the foldable vehicle seat including:
    a seat base;
    a seatback connected to the seat base for pivotal movement relative to the seat base from at least one generally vertical use position to a generally horizontal stow position atop the seat base;
    at least one mounting bracket mounted to the vehicle floor support;
    a riser assembly including at least two pivoting links, wherein each of which links are connected for pivotal rotation with respect to both the mounting bracket and the seat base such that, when the seatback is moved from its use position to the stow position, the seat base is moved rearward and downward to thereby provide a lower load floor position;
    a drive linkage interconnecting the seatback and the seat base for transmitting a portion of the force applied to move the seatback to rotate at least one of the pivoting links to move the seat base to a second position, wherein the drive linkage includes a drive member including a pin mounted on the seatback for rotation about the seatback's pivot axis and a slotted linkage member pivotally mounted on the seat base for rotation about a pivot axis parallel to the pivot axis of the seat back, the slotted linkage member including a drive slot and a driving connection to one of the pivoting links, whereby the slotted linkage member is sized and positioned so that the drive pin engages and is received within the drive slot in a first selected range of seatback inclinations, and whereby rotation of the seatback within the first selected range moves the drive pin within the slot, thereby rotating the slotted linkage member and thereby moving the pivoting links to raise or lower the seat base; and
    a seat base lock mechanism operably connected to engage and lock at least one of the pivoting links from rotation to thereby lock the seat base in a first position when the seatback is positioned within a defined range of use positions, and unlock the at least one of the pivoting links to allow rotation of the links to thereby move the seat base to a second position when the seatback is positioned outside the defined range.

2. The foldable vehicle seat of claim 1 wherein the drive linkage includes at least one connecting link mounted in driving connection between one of the pivoting links and the plate.

3. The foldable vehicle seat of claim 1 wherein at least one of the mounting brackets is mounted directly to the vehicle floor support.

4. The foldable vehicle seat of claim 1 further including a seat adjustment mechanism mounted on the pivot axis of the seatback for unlocking the seatback, adjusting, and locking the seatback in one of a plurality of use positions, and for unlocking the seatback to allow adjustment of the seatback to its stow position.

5. The foldable vehicle seat of claim 1 further including one or more seat track assemblies and seat track locking mechanism, and wherein at least one mounting bracket is mounted for slidable movement within at least one of the seat track assemblies such that the seat may be slidably positioned in the fore-aft direction and locked in place as desired.

6. The foldable vehicle seat of claim 5 wherein the riser assembly includes at least one of the pivoting links attached at the rear of the seat base and the mounting bracket attached to said pivoting link includes a releasable latch, which latch releasably attaches said mounting bracket to one of the seat track assemblies such that the rear portion of the seat base may be detached from the seat track assembly, thereby allowing the seat pivot forward and upward as desired.

7. The foldable vehicle seat of claim 1 wherein the seat is mounted in the vehicle forward of a generally horizontal load surface that is located above the vehicle floor support, wherein the downward and rearward movement of the seat base positions the folded seat in a lower load floor position in generally the same vertical plane as the horizontal load surface, and more rearward position, thereby reducing the gap between the horizontal load surface and the folded seat.

8. The foldable vehicle seat of claim 7 wherein a portion of the generally horizontal load surface rearward of the foldable vehicle seat is a folded vehicle seat.

9. The foldable vehicle seat of claim 1 wherein the lock mechanism is integrated into the drive linkage.

10. The foldable vehicle seat of claim 9 wherein the drive linkage includes:
    a lock cam mounted on the seatback for rotation about the seatback's pivot axis, the lock cam including an arcuate convex cam surface;
    wherein the slotted linkage member includes an arcuate concave cam surface; and
    whereby the slotted linkage member is sized and positioned so that the arcuate concave cam surface of the slotted linkage member engages the arcuate convex cam surface of the lock cam as the lock cam is rotated in a second selected range of seatback inclinations, whereby the engagement of the arcuate convex cam surface of the lock cam and the arcuate concave cam surface of the slotted linkage member prevents rotation of the slotted linkage member, thereby locking the seat base from movement as the seatback is moved within the second selected range.

11. The foldable vehicle seat of claim 10 wherein the drive linkage includes at least one connecting link mounted in driving connection between one of the pivoting links and the slotted linkage member.

12. The foldable vehicle seat of claim 9 wherein at least one of the pivoting links includes a cam surface and the drive linkage includes:
    a generally convex cam surface located on the drive member;
    wherein the slotted linkage member is a slotted bell crank;
    wherein the lock mechanism has first and second ends, the first end including a drive pin, the second end including a cam surface positioned to be engageable with the cam surface of the pivoting link whereby the second end of the lock mechanism may be moved to a position where the cam surface of the lock mechanism engages the cam surface of the pivoting link and locks the pivoting link from rotation, thereby locking the seat base in position, whenever the seat back is positioned in a first selected range of use positions;

whereby the plate is sized and positioned so that the generally convex cam surface of the plate engages the drive pin of the lock mechanism as the plate is rotated in a second selected range of seatback inclinations, whereby the engagement of the arcuate convex cam surface and the drive pin of the lock mechanism causes the lock mechanism to rotate about its pivot axis such that rotation of the seatback within the second selected range causes the drive pin of the lock cam to contact the cam surface of the drive plate, thereby causing the lock cam to rotate out of its position of locking engagement with the pivoting link; and whereby the plate is sized and positioned so that the drive pin engages and is received within the drive slot in the second selected range of seatback inclinations, whereby rotation of the seatback within the second selected range moves the drive pin on the drive plate within the drive slot on the bell crank, thereby rotating the bell crank and thereby moving the pivoting links to raise or lower the seat base.

13. The foldable vehicle seat of claim 12 wherein the drive linkage includes at least one connecting link mounted in driving connection between the one of the pivoting links and the slotted bell crank.

14. A foldable vehicle seat mounted in a vehicle rearward of at least one forward vehicle seat, the foldable vehicle seat including:

a seat base;

a seatback connected to the seat base for pivotal movement relative to the seat base from at least one generally vertical use position to a generally horizontal stow position atop the seat base;

at least one mounting bracket mounted to a vehicle floor support;

a riser assembly including at least two pivoting links, wherein each of which links are connected for pivotal rotation with respect to both the mounting bracket and the seat base such that, when the seatback is moved from its use position to the stow position, the seat base is moved rearward and downward to thereby provide a lower load floor position; and a drive linkage interconnecting the seatback and the seat base for transmitting a portion of the force applied to move the seatback to rotate at least one of the pivoting links to move the seat base to a second position, the drive linkage including, a drive pin mounted on the seatback for rotation about the seatback's pivot axis, a plate pivotally mounted on the seat base for rotation about a pivot axis parallel to the pivot axis of the seat back, the plate including a drive slot and a driving connection to one of the pivoting links, and whereby the plate is sized and positioned so that the drive pin engages and is received within the drive slot in a selected range of non-use positions, whereby rotation of the seatback within the range of non-use positions moves the drive pin within the slot, thereby rotating the plate and thereby moving the pivoting links to raise or lower the seat base; and a seat base lock mechanism operably connected to engage and lock at least one of the pivoting links from rotation to thereby lock the seat base in a first position when the seatback is positioned within a selected range of use positions, and unlock the at least one of the pivoting links to allow rotation of the links to thereby move the seat base to a second position when the seatback is positioned outside the range.

15. The foldable vehicle seat of claim 14 further including one or more seat track assemblies and a seat track locking mechanism, and wherein each mounting bracket is mounted for slidable movement within at least one of the seat track assemblies such that the seat may be slidably positioned in the fore-aft direction and locked in place as desired.

16. The foldable vehicle seat of claim 15 wherein the riser assembly includes at least one of the pivoting links attached at the rear of the seat base, and the mounting bracket attached to said pivoting link includes a releasable latch, which latch releasably attaches said mounting bracket to one of the seat track assemblies such that the rear portion of the seat base may be detached from the seat track assembly, thereby allowing the seat base to pivot forward and upward as desired.

17. A foldable vehicle seat mounted in a vehicle rearward of at least one forward vehicle seat, the foldable vehicle seat including:

a seat base;

a seatback connected to the seat base for pivotal movement relative to the seat base from at least one generally vertical use position to a generally horizontal stow position atop the seat base;

at least one mounting bracket mounted to a vehicle floor support;

a riser assembly including at least two pivoting links, wherein each of which links are connected for pivotal rotation with respect to both the mounting bracket and the seat base such that, when the seatback is moved from its use position to the stow position, the seat base is moved rearward and downward to thereby provide a lower load floor position, and at least one of the pivoting links including a cam surface; and a drive linkage interconnecting the seatback and the seat base for transmitting a portion of the force applied to move the seatback to rotate at least one of the pivoting links to move the seat base to a second position, the drive linkage including, a drive plate mounted on the seatback for rotation about the seatback's pivot axis, the drive plate including a drive pin and a generally convex cam surface, a slotted bell crank pivotally mounted on the seat base for rotation about a pivot axis parallel to the pivot axis of the seat back, the slotted bell crank including a drive slot and a driving connection to one of the pivoting links, a lock cam pivotally connected to the bell crank, the lock cam having first and second ends, the first end including a drive pin, the second end including a cam surface positioned to be engageable with the cam surface of the pivoting link whereby the lock cam may be moved to a position where the cam surface of the lock cam engages the cam surface of the pivoting link and lock the pivoting link from rotation, thereby locking the seat base in position, whenever the seat back is positioned in a first selected range of use positions;

whereby the drive plate is sized and positioned so that the generally convex cam surface of the plate engages the drive pin of the lock cam as the plate is rotated in a second selected range of seatback inclinations, whereby the engagement of the arcuate convex cam surface and the drive pin of the lock cam causes the lock cam to rotate about its pivot axis such that rotation of the seatback within the second selected range causes the drive pin of the lock cam to contact the cam surface of the drive plate, thereby causing the lock cam to rotate out of its position of locking engagement with the pivoting link, and whereby the plate is sized and positioned so that the drive pin engages and is received within the drive slot in the second selected range of seatback inclinations, whereby rotation of the seatback within the second selected range moves the drive pin on the drive plate within the drive slot on the bell crank, thereby rotating the bell crank and thereby moving the pivoting links to raise or lower the seat base.

18. The foldable vehicle seat of claim 17 wherein the riser assembly includes at least one of the pivoting links attached at the rear of the seat base, and further including:

one or more seat track assemblies and a seat track locking mechanism, and wherein each mounting bracket is mounted for slidable movement within at least one of the seat track assemblies such that the seat may be slidably positioned in the fore-aft direction and locked in place as desired; and the mounting bracket attached to each of the at least one of the pivoting links attached at the rear of the seat base includes a releasable latch, which latch releasably attaches said mounting bracket to one of the seat track assemblies such that the rear portion of the seat base may be detached from the seat track assembly, thereby allowing the seat pivot forward and upward as desired.

* * * * *